(12) United States Patent
Imai et al.

(10) Patent No.: US 8,735,527 B2
(45) Date of Patent: May 27, 2014

(54) LAMINATING ADHESIVE

(75) Inventors: Akihiro Imai, Chiba (JP); Takeshi Osaki, Chiba (JP); Shigetoshi Sasano, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 13/430,469

(22) Filed: Mar. 26, 2012

(65) Prior Publication Data

US 2012/0180952 A1 Jul. 19, 2012

Related U.S. Application Data

(63) Continuation of application No. 12/745,852, filed as application No. PCT/JP2008/071552 on Nov. 27, 2008.

(30) Foreign Application Priority Data

Dec. 3, 2007 (JP) ................................. 2007-312542

(51) Int. Cl.
*C08G 18/32* (2006.01)
*C09J 175/04* (2006.01)

(52) U.S. Cl.
USPC .......................... 528/59; 528/85; 156/331.7

(58) Field of Classification Search
None
See application file for complete search history.

(56) References Cited

U.S. PATENT DOCUMENTS

| 4,996,283 | A * | 2/1991 | Greco et al. ................... 528/80 |
| 6,288,201 | B1 * | 9/2001 | Sasano et al. ................. 528/83 |
| 2010/0249360 | A1 * | 9/2010 | Imai et al. ...................... 528/59 |

FOREIGN PATENT DOCUMENTS

| EP | 0 976 723 | A2 | 2/2000 |
| EP | 1 074 597 | A2 | 2/2001 |
| EP | 1 074 597 | A3 | 2/2002 |
| EP | 2 040 306 | A1 | 3/2009 |
| JP | 06-100851 | | 4/1994 |
| JP | 06-100851 | * | 12/1994 |
| JP | 09-194560 | | 7/1997 |
| JP | 10-139848 | | 5/1998 |
| JP | 2000-44918 | A | 2/2000 |
| JP | 2001-107016 | | 4/2001 |
| JP | 2003-129024 | | 5/2003 |
| JP | 2003-213237 | | 7/2003 |
| JP | 2003-372944 | | 11/2003 |
| JP | 2006-319250 | | 11/2006 |

OTHER PUBLICATIONS

International Search Report PCT/JP2008/071552 dated Feb. 10, 2009.
Office Action in U.S. Appl. No. 17/745,852 dated Sep. 26, 2011.
Office Action Chinese Application No. 20880116302.8 dated Oct. 8, 2012.
European Search Report issued on Jul. 4, 2013 in connection with the European Patent Application No. 08857649.1.

* cited by examiner

*Primary Examiner* — Randy Gulakowski
*Assistant Examiner* — Jeffrey Washville
(74) *Attorney, Agent, or Firm* — Foley & Lardner LLP

(57) ABSTRACT

[Solution to Problem] The laminating adhesive of the present invention includes a polyisocyanate component (A) and a polyol component (B), wherein the polyisocyanate component (A) contains a polyisocyanate (A1) that does not contain an aromatic ring, and the polyol component (B) contains a macropolyol (B1) that does not contain an aromatic ring but contains a cyclohexane ring.

1 Claim, No Drawings

LAMINATING ADHESIVE

CROSS-REFERENCE TO RELATED APPLICATIONS

This application is a continuation of U.S. application Ser. No. 12/745,852, which is the national phase application of PCT Patent Application No. PCT/JP2008/071552 filed Nov. 27, 2008, which claims the priority benefit of Japanese Application No. 2007-312542 filed Dec. 3, 2007 each of those applications being incorporated herein in their entirety by reference.

TECHNICAL FIELD

The present invention relates to a laminating adhesive, and more particularly, the present invention relates to a laminating adhesive suitably used for laminating composite sheets that are used under an outdoor environment and a similar environment thereof.

BACKGROUND ART

Composite sheets are manufactured by laminating a plurality of sheet materials using an adhesive: the sheet materials are selected from various plastic films, metal foils such as aluminum foils, metal deposited films, silica deposited films, and the like.

For the adhesive used for laminating composite sheets, a two component-type polyurethane adhesive in which a polyisocyanate component and a polyol component are mixed has been widely used, because of its superior adhesion performance.

As such a two component-type polyurethane adhesive, for example, there has been proposed a two component-curing laminating adhesive composition in which a polyol component is used as a main component, and a polyisocyanate component is used as a curing agent (for example, see Patent Document 1 below).

The composite sheets are used for outdoor sheets that are used under an outdoor environment, for example, leisure sheets, tents, plastic green houses, sheets for porch, rain coats, umbrellas, hoods, waterproof cloth, sheets for covering automobiles, sheets for covering building materials, and back sheets for solar batteries.

Patent Document 1: Japanese Unexamined Patent Publication No. 2003-129024

DISCLOSURE OF THE INVENTION

Problem to be Solved by the Invention

However, when the two component-curing laminating adhesive composition described in the above Patent Document 1 is used for a composite sheet used under an outdoor environment (in the following, referred to as an outdoor composite sheet), a problem of adhesive yellowing with age occurs due to solar ultraviolet radiation, or of delamination is caused from adhesive deterioration by rainwater, sunlight irradiation heat, and ultraviolet rays.

An object of the present invention is to provide a laminating adhesive that suppresses the yellowing with age; has excellent durability under rainwater, sunlight irradiation heat, and ultraviolet rays; and even brings out excellent adhesion performance.

Means for Solving the Problem

The laminating adhesive of the present invention includes a polyisocyanate component (A) and a polyol component (B), wherein the polyisocyanate component (A) contains a polyisocyanate (A1) that does not contain an aromatic ring; and the polyol component (B) contains a macropolyol (B1) that does not contain an aromatic ring but contains a cyclohexane ring.

Furthermore, in the laminating adhesive of the present invention, it is preferable that the cyclohexane ring concentration relative to the solid content of the polyisocyanate component (A) and the polyol component (B) in total is 2.5 mmol/g or less.

Furthermore, in the laminating adhesive of the present invention, it is preferable that the macropolyol (B1) is a polyurethane polyol (B1-1') obtained by reaction of a crystalline polyol (B1-1a') that does not contain an aromatic ring and is crystalline at normal temperature with a polyisocyanate (B1-1b) that does not contain an aromatic ring but contains a cyclohexane ring; it is more preferable that the crystalline polyol (B1-1a') contains a crystalline polycarbonate diol that is crystalline at normal temperature; and it is more preferable that the crystalline polycarbonate diol that is crystalline at normal temperature has a number average molecular weight of 1000 or less.

Furthermore, in the laminating adhesive of the present invention, it is preferable that the polyisocyanate component (A) does not contain a derivative of isophorone diisocyanate, and in such a case, it is preferable that the macropolyol (B1) is a polyurethane polyol (B1-1') obtained by reaction of a crystalline polycarbonate diol that has a number average molecular weight of 5000 or less, does not contain an aromatic ring, and is crystalline at normal temperature, with a polyisocyanate (B1-1b) that does not contain an aromatic ring but contains a cyclohexane ring.

Furthermore, the laminating adhesive of the present invention is preferably used for laminating outdoor composite sheets.

Effects of the Invention

The laminating adhesive of the present invention brings out excellent adhesion performance while suppressing the yellowing with age due to solar ultraviolet radiation, and suppresses deterioration by rainwater, sunlight irradiation heat, and ultraviolet rays, so that occurrence of delamination is prevented. Therefore, the laminating adhesive of the present invention is suitable for laminating outdoor composite sheets.

EMBODIMENT OF THE INVENTION

A laminating adhesive of the present invention is a two component-type polyurethane adhesive, and contains a polyisocyanate component (A) and a polyol component (B).

In the present invention, the polyisocyanate component (A) contains a polyisocyanate (A1) that does not contain an aromatic ring, that is, alicyclic polyisocyanate, aliphatic polyisocyanate, and/or derivatives thereof.

Examples of the alicyclic polyisocyanate include, alicyclic diisocyanate such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (isophorone diisocyanate; IPDI), 4,4'-, 2,4'- or 2,2'-dicyclohexylmethane diisocyanate or mixtures thereof ($H_{12}$MDI), methyl-2,4-cyclohexane diisocyanate, methyl-2,6-cyclohexane diisocyanate, 1 3- or 1,4-bis(isocyanatomethyl)cyclohexane or mixtures thereof ($H_6$XDI), and norbornane diisocyanate (NBDI).

Examples of the aliphatic polyisocyanate include aliphatic diisocyanate such as trimethylene diisocyanate, tetramethylene diisocyanate, hexamethylene diisocyanate (HDI), pentamethylene diisocyanate, 1,2-, 2,3- or 1,3-butylenediisocyanate, and 2,4,4- or 2,2,4-trimethylhexamethylene diisocyanate.

Examples of the derivatives of the alicyclic polyisocyanate and the aliphatic polyisocyanate include multimers (dimers, trimers, pentamers, septamers, etc.) of the above-described polyisocyanate (A1) (that is, alicyclic polyisocyanate and/or aliphatic polyisocyanate); a biuret-modified substance of the above-described polyisocyanate (A1) (for example, biuret-modified polyisocyanate produced by reaction of the above-described polyisocyanate (A1) with water); an allophanate-modified substance of the polyisocyanate (A1) (for example, allophanate-modified polyisocyanates produced by reaction of the above-described polyisocyanate (A1) with monol or polyhydric alcohol (described later)); a polyol-modified substance of the polyisocyanate (A1) (for example, polyol-modified polyisocyanates produced by reaction of the polyisocyanate (A1) with polyhydric alcohol (described later)); a urea-modified substance of the polyisocyanate (A1) (for example, urea-modified polyisocyanate produced by reaction of the polyisocyanate (A1) and diamine); oxadiazinetrione (for example, oxadiazinetriones produced by reaction of the polyisocyanate (A1) and carbon dioxide); and a carbodiimide-modified substance of the polyisocyanate (A1) (carbodiimide-modified polyisocyanates produced by decarboxylation condensation reaction of the polyisocyanate (A1)).

Preferable examples of the polyisocyanate that does not contain an aromatic ring include IPDI, $H_{12}$MDI, $H_6$XDI, NBDI, HDI, and derivatives thereof.

In the present invention, the polyol component (B) contains a macropolyol (B1) that does not contain an aromatic ring but contains a cyclohexane ring.

Examples of the above-described macropolyol (B1) include a polyurethane polyol (B1-1) that is obtained by reaction of a polyol (B1-1a) that does not contain an aromatic ring with a polyisocyanate (B1-1b) that does not contain an aromatic ring but contains a cyclohexane ring; and a polyester polyol (described later) that contains alicyclic polycarboxylic acid (described later) and/or alicyclic diol (described later).

Examples of the polyol (B1-1a) that does not contain an aromatic ring include a polyester polyol that does not contain an aromatic ring, a polycarbonate polyol that does not contain an aromatic ring, and a polyether polyol that does not contain an aromatic ring.

Preferably, the polyol (B1-1a) that does not contain an aromatic ring is a crystalline polyol (B1-1a') that does not contain an aromatic ring and is crystalline at normal temperature, such as a crystalline polyester polyol that does not contain an aromatic ring, a crystalline polycarbonate polyol that does not contain an aromatic ring, and a crystalline polyether polyol that does not contain an aromatic ring. More preferably, the polyol (B1-1a) that does not contain an aromatic ring is a crystalline polycarbonate polyol that does not contain an aromatic ring.

The crystalline polyol (B1-1a') (crystalline polyester polyol, crystalline polycarbonate polyol, and crystalline polyether polyol) refers to a polyol that is not in a liquid state (liquid or fluid) at normal temperature but in a solid state at normal temperature.

The above-described polyester polyol can be obtained, for example, by a condensation reaction between a polybasic acid selected from aliphatic polycarboxylic acid and alicyclic polycarboxylic acid, and a polyhydric alcohol selected from aliphatic diol, alicyclic diol, and polyfunctional polyol; or by a transesterification reaction between an alkyl ester of a polybasic acid and a polyhydric alcohol.

Examples of the aliphatic polycarboxylic acid include succinic acid, glutaric acid, adipic acid, pimelic acid, cork acid, azelaic acid, sebacic acid, dodecanedioic acid, and hydrogenated dimer acid.

Examples of the alicyclic polycarboxylic acid include hexahydrophthalic acid and tetrahydrophtalic acid.

Examples of the alkyl ester of the polybasic acid include C1-4 alkyl esters of the above-described polybasic acids.

Examples of the aliphatic diol include ethylene glycol, diethylene glycol, triethylene glycol, propylene glycol, dipropylene glycol, tripropylene glycol, 1,4-butanediol, 1,3-butanediol, 1,2-butanediol, 2-methyl-1,3-propanediol, 1,5-pentanediol, 3-methyl-1,5-pentanediol, 2,4-diethyl-1,5-pentanediol, 2,2,4-trimethylpentane-1,3-diol, 1,6-hexandiol, neopentyl glycol, 1,5-heptanediol, 1,7-heptanediol, 3,3'-dimethylolheptane, 1,8-octanediol, 1,9-nonanediol, 1,10-decanediol, 1,11-undecanediol, 1,12-dodecanediol, 12-hydroxystearyl alcohol, and a hydrogenated dimer diol.

Examples of the alicyclic diol include hydrogenated bisphenol A, hydrogenated xylylenediol, cyclohexanediol, and cyclohexanedimethanol.

Examples of the polyfunctional polyol include an aliphatic polyol having three or more hydroxyl groups, such as glycerin, trimethylolpropane, pentaerythritol, and sorbitol.

The condensation reaction or the transesterification reaction can be performed according to a known process without any particular limitation, and for example, the respective components are charged, and the mixture was allowed to react at 150 to 240° C. for 7 to 50 hours. Further, a known catalyst (for example, a titanium-based catalyst, a zinc-based catalyst, etc.) can be added for such reactions.

Examples of the above-described polyester polyol include lactone-based polyester polyols such as polycaprolactone polyols and polyvalerolactone polyols obtained by ring-opening polymerization of lactones such as ε-caprolactone and γ-valerolactone using the above-described polyhydric alcohol as an initiator.

Examples of the crystalline polyester polyol that does not contain an aromatic ring include polyethylene adipate, polybutylene adipate, and polyethylene butylene adipate with a number average molecular weight of 1000 or more.

The above-described polycarbonate polyol can be obtained, for example, by allowing phosgene, dialkyl carbonate, diallyl carbonate, or alkylene carbonate to react using the above-described polyhydric alcohol as an initiator under, for example, presence or absence of a catalyst.

Examples of the crystalline polycarbonate polyol that does not contain an aromatic ring include 1,6-hexanediol-base polycarbonate diol with a number average molecular weight of 400 or more.

The above-described polyether polyol can be obtained, for example, by performing an addition reaction of alkylene oxides such as ethylene oxide and/or propylene oxide using the above-described polyhydric alcohol as an initiator. To be specific, examples thereof include polyethylene glycol, polypropylene glycol, and polyethylenepolypropylene glycol (random or block copolymer). Further, polytetramethylene glycol obtained by ring-opening polymerization of tetrahydrofurans is another example.

Examples of the crystalline polyether polyol that does not contain an aromatic ring include polyethylene glycol, polyethylenepolypropylene glycol (ethylene oxide-propylene oxide block copolymer), and polyoxytetramethylene ether glycol with a number average molecular weight of 1000 or more.

The number average molecular weight of the above-described polyol (B1-1a) (the above-described polyester polyol, polycarbonate polyol, and polyether polyol) is, for example, 100 to 5000.

In the case when a derivative of 3-isocyanatomethyl-3,5, 5-trimethylcyclohexylisocyanate is contained as the polyisocyanate component (A) and when the polyurethane polyol (B1-1') is prepared using the crystalline polycarbonate diol that is in a crystalline state at normal temperature as the above-described crystalline polyol (B1-1a') in the polyol component (B), the number average molecular weight of the crystalline polycarbonate diol is preferably 1000 or less. With the crystalline polycarbonate diol having the number average molecular weight of 1000 or less, excellent transparency can be ensured even if the derivative of 3-isocyanatomethyl-3,5, 5-trimethylcyclohexylisocyanate is contained as the polyisocyanate component (A). There may be a case where excellent transparency cannot be ensured when the number average molecular weight of the crystalline polycarbonate diol exceeds 1000 and the derivative of 3-isocyanatomethyl-3,5, 5-trimethylcyclohexylisocyanate is contained as the polyisocyanate component (A).

On the other hand, when the polyisocyanate component (A) does not contain the derivative of 3-isocyanatomethyl-3, 5,5-trimethylcyclohexylisocyanate and the polyurethane polyol (B1-1') is prepared using the crystalline polycarbonate diol that is in a crystalline state at normal temperature as the above-described crystalline polyol (B1-1a') in the polyol component (B), the number average molecular weight of the crystalline polycarbonate diol is preferably 5000 or less. When the derivative of 3-isocyanatomethyl-3,5,5-trimethylcyclohexylisocyanate is not contained as the polyisocyanate component (A) and the number average molecular weight of the crystalline polycarbonate diol is 5000 or less, excellent transparency can be ensured.

Transparency is an important property particularly for a laminating adhesive that is used for transparent outdoor composite sheets.

The number average molecular weight in the polyol component (B) can be calculated by a known hydroxyl value measurement method such as acetylation method or phthalic anhydride method and the number of the functional group in the initiator or the raw material.

As the above-described polyol (B1-1a), the above-described polyhydric alcohol can also be used in combination with the above-described polyester polyol, polycarbonate polyol, and/or polyether polyol. For such a polyhydric alcohol, preferably, the above-described alicyclic diol can also be used. When the polyhydric alcohol is used together as the above-described polyol (B1-1a), the polyhydric alcohol is used in an amount of for example, 0.1 to 50 parts by weight, or preferably 0.5 to 30 parts by weight relative to 100 parts by weight of the above-described polyester polyol, polycarbonate polyol, and/or polyether polyol.

Examples of the polyisocyanate (B1-1b) that does not contain an aromatic ring but contains a cyclohexane ring include the above-described alicyclic polyisocyanate and derivatives thereof. Preferable examples are IPDI, $H_{12}$MDI, $H_6$XDI, NBDI, and derivatives thereof.

The polyurethane polyol (B1-1) can be obtained by subjecting the above-described polyol (B1-1a) and the above-described polyisocyanate (B1-1b) to urethane reaction at such a ratio that the equivalent ratio (NCO/OH) of the isocyanate group in the above-described polyisocyanate (B1-1b) relative to the hydroxyl group in the above-described polyol (B1-1a) is smaller than 1, or preferably 0.5 to 0.9. A known method may be used for the urethane reaction.

Preferably, the polyurethane polyol (B1-1) is polyurethanepolycarbonate polyol obtained by reaction of the above-described polycarbonate polyol with the above-described alicyclic polyisocyanate. More preferably, the polyurethane polyol (B1-1) is polyurethane crystalline polycarbonate diol obtained by reaction of the above-described crystalline polycarbonate diol with alicyclic polyisocyanate.

Also, as described above, examples of the macropolyol (B1) include a polyester polyol that contains alicyclic polycarboxylic acid and/or alicyclic diol.

The hydroxyl group equivalent (OH equivalent) of the above-described macropolyol (B1) is, for example, 1000 to 15000, or preferably 1500 to 10000.

Other than the above-described macropolyol (B1), for example, the above-described polyhydric alcohol may also be contained in the polyol component (B). When the polyhydric alcohol is contained as the polyol component, for example, 0.01 to 50 parts by weight, or preferably 0.1 to 30 parts by weight of the polyhydric alcohol relative to 100 parts by weight of the macropolyol (B1) is contained.

A silane coupling agent may be mixed as necessary in one of or both of the polyisocyanate component (A) and the polyol component (B).

The silane coupling agent that may be used is represented, for example, by the structural formula: R—Si≡(X)$_3$ or R—Si≡(R')(X)$_2$ (wherein R represents an organic group having a vinyl, epoxy, amino, imino, isocyanate, or mercapto group; R' represents a lower alkyl group; and X represents a methoxy group, an ethoxy group, or chlorine atom).

Specific examples of the silane coupling agent include chlorosilanes such as vinyl trichlorosilane; aminosilanes such as N-β-(aminoethyl)-γ-aminopropyltrimethoxysilane, γ-aminopropyltriethoxysilane, N-β-(aminoethyl)-γ-propylmethyldimethoxysilane, n-(dimethoxymethylsilylpropyl)ethylenediamine, n-(triethoxysilylpropyl)ethylenediamine, and N-phenyl-γ-aminopropyl trimethoxysilane; epoxysilanes such as γ-glycidoxypropyltrimethoxysilane, γ-glycidoxypropyltriethoxysilane, β-(3,4-epoxycyclohexyl)ethyltrimethoxysilane, and di(γ-glycidoxypropyl)dimethoxysilane; vinyl silanes such as vinyltriethoxysilane; and isocyanate silanes such as 3-isocyanatopropyltrimethoxysilane, and 3-isocyanatopropyltriethoxysilane.

These silane coupling agents can be used alone or in combination of two or more. The amount of the silane coupling agent to be blended is, for example, 0.001 to 10 parts by weight, or preferably 0.01 to 6 parts by weight per 100 parts by weight of the total amount of the polyisocyanate component (A) and the polyol component (B).

Further, additives such as epoxy resins, catalysts, coating improving agents, leveling agents, antifoaming agents, stabilizers including antioxidant and ultraviolet absorbers, plasticizers, surfactants, pigments, fillers, organic or inorganic fine particles, and antifungal agents may be blended with either or both of the polyisocyanate component (A) and the polyol component (B) as required. The amount of these additives to be blended is appropriately determined according to the purposes and applications.

When an epoxy resin is to be blended in order to improve adherence, a hydrogenated bisphenol A epoxy resin may be blended to further improve resistance to yellowing.

A laminating adhesive of the present invention is used as a two component-type polyurethane adhesive in which the polyisocyanate component (A) and the polyol component (B) are blended. That is, in the laminating adhesive of the present invention, the polyisocyanate component (A) and the polyol component (B) are prepared separately in advance, and the polyisocyanate component (A) and the polyol component (B)

are blended upon use, and applied on an adherend (sheet material). The polyisocyanate component (A) and the polyol component (B) are blended at such a ratio that the equivalent ratio (NCO/OH) of the isocyanate group in the polyisocyanate component (A) relative to the hydroxyl group in the polyol component (B) is, for example, 0.6 to 10, or preferably 0.8 to 6.

In the laminating adhesive of the present invention, the concentration of the cyclohexane ring is, for example, 2.5 mmol/g or less, or preferably, 2 mmol/g or less, or normally, 0.1 mmol/g or more relative to the total solid content of the polyisocyanate component (A) and the polyol component (B). When the concentration of the cyclohexane ring exceeds 2.5 mmol/g, there may be a case where excellent transparency as a laminating adhesive cannot be ensured.

The laminating adhesive of the present invention is, to be specific, prepared as a solvent-based or solventless type, and mainly used for laminating composite sheets.

For example, when the laminating adhesive is prepared as a solvent-based type, the polyisocyanate component (A) and the polyol component (B) are diluted with an organic solvent and blended, and the mixture is applied on one surface of the sheet material using a solvent-type laminator. Then, after the solvent is evaporated, the sheet is bonded to another sheet material, and then aged to be cured at normal temperature or under heat. The amount of the mixture applied is set in the range of, for example, about 2.0 to 10.0 g/m$^2$ after evaporation of the solvent.

When the blending viscosity of the polyisocyanate component (A) and the polyol component (B) is about 100 to 10000 mPa·s, or preferably about 100 to 5000 mPa·s at normal temperature to 100° C., the laminating adhesive can be prepared as a solventless type.

For example, when the laminating adhesive is prepared as a solventless type, the polyisocyanate component (A) and the polyol component (B) are blended as is, and the mixture is applied on one surface of the sheet material using a solventless-type laminator. Then, the sheet is bonded to another sheet material, and then aged to be cured at normal temperature or under heat. The amount of the mixture applied is set in the range of, for example, about 0.5 to 5.0 g/m$^2$.

The sheet material is not limited as long as the sheet can be laminated as a composite sheet, and examples thereof include metal foils and plastic sheets.

Examples of the metal that may be used to form the metal foil include aluminum, stainless steel, iron, copper, and lead. The thickness of the metal foil is usually 5 to 100 μm, or preferably 7 to 50 μm.

Examples of the plastic that may be used to form the plastic sheet include an olefinic polymer (for example, polyethylene and polypropylene); a polyester polymer (for example, polyalkylene terephthalate such as polyethylene terephthalate (PET) and polybutylene terephthalate; polyalkylene naphthalate; and a copolyester that contains these polyalkylene arylate units as main components); a polyamide polymer (for example, nylon 6 and nylon 66); and a vinyl polymer (for example, polyvinyl chloride, ethylene-vinyl acetate copolymer, and ethylene-vinyl alcohol copolymer).

The plastic sheet may also include an inorganic layer formed on at least one side thereof. The inorganic layer may be formed by a vacuum evaporation, sputtering, or sol-gel technique. Examples of the inorganic substance that may be used to form the inorganic layer include an element such as titanium, aluminum, and silicon; or an inorganic compound including these element(s) (for example, oxide). Specific examples thereof include an aluminum-deposited sheet and a silica-deposited sheet.

The thickness of the plastic sheet is usually 5 to 200 μm, or preferably 10 to 150 μm.

The surfaces of the metal foil and the plastic sheet may be subjected to surface treatment, such as corona discharge treatment and primer treatment. Further, the metal foil and the plastic sheet may be appropriately printed.

The laminating adhesive of the present invention does not contain an aromatic ring, and therefore yellowing with age can be suppressed. Meanwhile, the laminating adhesive of the present invention contains a cyclohexane ring, and therefore excellent adhesive strength and mechanical strength can be ensured over a long period of time. Then, the laminating adhesive of the present invention can ensure excellent adhesion performance and transparency.

Therefore, the laminating adhesive of the present invention can suppress yellowing with age; has excellent durability under rainwater, sunlight irradiation heat, and ultraviolet rays; and even brings out excellent adhesion performance, so that occurrence of delamination can be prevented. Therefore, the laminating adhesive of the present invention is suitably used for laminating, in particular, composite sheets used under an outdoor environment, i.e., outdoor composite sheets.

To be more specific, the laminating adhesive of the present invention is suitably used for laminating outdoor composite sheets that are used under an outdoor environment, such as leisure sheets, tents, plastic green houses, sheets for porch, rain coats, umbrellas, hoods, waterproof cloth, sheets for covering automobiles, sheets for covering building materials, and back sheets for solar batteries.

EXAMPLES

Hereinafter, the present invention will be described in more detail by way of Examples and Comparative Examples, but the present invention is not limited thereto.

Preparation Example 1

Preparation of Polyol Component A 130.5 g of 3-isocyanatomethyl-3,5,5-trimethylcyclohexylisocyanate and 345.3 g of 1,6-hexanediol-base polycarbonate diol (manufactured by Ube Industries, Ltd. solid at normal temperature) having a number average molecular weight of 500 were stirred under a nitrogen gas stream at 90 to 95° C. and the mixture was subjected to urethane reaction, to synthesize a polyurethane polyol. After confirming that no NCO peak was found by IR measurement, 500 g of ethyl acetate and 23.8 g of γ-glycidoxypropyltrimethoxysilane (KBM403 manufactured by Shin-Etsu Chemical Co. Ltd.) were added thereto, thereby obtaining a polyol component A having a solid content of 50 wt %.

Preparation Example 2

Preparation of Polyol Components B to M

Polyol components B to M were prepared in the same manner as the method in Preparation Example 1, except that the components and the mixing ratios as shown in Table 1 were used.

Preparation Example 3

Preparation of Polyol Component N 330.68 g of isophthalic acid, 71.38 g of ethylene glycol, and 359.31 g of neopentyl glycol were subjected to esterification reaction at 180 to 220° C. under a nitrogen gas stream. After a predetermined amount of water was distilled off, 402.57 g of sebacic acid was added thereto, and the resulting mixture was subjected to esterification reaction at 180 to 220° C., to give a polyester polyol PE1 having a number average molecular weight of about 2,500.

Then, 446.6 g of the polyester polyol PE1, 32.5 g of 3-isocyanatomethyl-3,5,5-trimethylcyclohexylisocyanate, 191.4 g of ethyl acetate were stirred under a nitrogen gas stream at 90 to 95° C. and the mixture was subjected to urethane reaction, to synthesize a polyurethane polyol.

After confirming that no NCO peak was found by IR measurement, 314.04 g of ethyl acetate, 2.15 g of diethylene glycol, and 23.95 g of γ-glycidoxypropyltrimetoxysilane (KBM403 manufactured by Shin-Etsu Chemical Co., Ltd.) were added thereto, thereby obtaining a polyol component N having a solid content of 50 wt %.

Preparation Example 4

Preparation of Polyol Component O 735.19 g of adipic acid, 184.56 g of ethylene glycol, 83.02 g of neopentyl glycol, 200.79 g of 1,6-hexanediol were subjected to esterification reaction under a nitrogen gas stream at 180 to 220° C., to give a polyester polyol PE2 having a number average molecular weight of about 5,500.

Then, 448 g of the polyester polyol PE2, 470.5 g of ethyl acetate, 22.4 g of γ-glycidoxypropyltrimetoxysilane (KBM403 manufactured by Shin-Etsu Chemical Co., Ltd.) were stirred at 50° C. until the mixture became homogenous, to give a polyol component O.

Preparation Example 5

Preparation of Polyol Component P 468 g of 1,6-hexanediol-base polycarbonate diol (manufactured by Ube Industries, Ltd., solid at normal temperature) having a number average molecular weight of 3000, 491.5 g of ethyl acetate, 23.4 g of γ-glycidoxypropyltrimethoxysilane (KBM403 manufactured by Shin-Etsu Chemical Co., Ltd.) were stirred at 50° C. until the mixture became homogenous, to give a polyol component P.

Preparation Example 6

Preparation of Polyol Component Q 136.3 g of 1,6-hexanediol, 92.4 g of neopentyl glycol, 95.6 g of ethylene glycol, 292.6 g of isophthalic acid, and 0.2 g of zinc acetate were subjected to esterification reaction at 180 to 220° C. under a nitrogen gas stream. After a predetermined amount of water was distilled off, 85.8 g of adipic acid was added thereto, and the resulting mixture was subjected to esterification reaction at 180 to 220° C., to give a polyester polyol PE3 having a number average molecular weight of about 10,000.

Then, 381.9 g of ethyl acetate, 45.3 g of a solution of bisphenol A epoxy resin in ethyl acetate (YD-902LEA60 manufactured by Tohto Kasei Co., Ltd.), 31.3 g of γ-glycidoxypropyltrimetoxysilane (KBM403 manufactured by Shin-Etsu Chemical Co., Ltd.), and 1.1 g of phosphoric acid were added thereto and stirred until the mixture became homogenous, to give a polyol component Q.

Preparation Example 7

Preparation of Polyisocyanate Component A

TAKENATE A-3070 (manufactured by Mitsui Chemicals Polyurethanes, Inc., a derivative of hexamethylene diisocyanate, ethyl acetate solution, a solid content of 75 wt %) was prepared as a polyisocyanate component A.

Preparation Example 8

Preparation of Polyisocyanate Component B 124.38 g of Vestanat T 1890/100 (manufactured by Huls AG. a derivative of 3-isocyanatomethyl-3,5,5-trimethylcyclohexylisocyanate) and 0.62 g of dibutyltin dilaurate were dissolved in 375 g of ethyl acetate, to prepare a polyisocyanate component B as a solution having a solid content of 25 wt %.

Preparation Example 9

Preparation of Polyisocyanate Component C

TAKENATE D-120N (manufactured by Mitsui Chemicals Polyurethanes, Inc., a derivative of 1,3-, and 1,4-bis(isocyanatomethyl)cyclohexane, ethyl acetate solution, a solid content of 75 wt %) was prepared as a polyisocyanate component C.

TABLE 1

| Polyol Component | | | A | B | C | D | E | F | G | H |
|---|---|---|---|---|---|---|---|---|---|---|
| Polyurethane Polyol | Polyisocyanate | IPDI | 130.5 | 75.1 | 36.4 | 23.4 | 113.7 | | | 46.7 |
| | | H$_6$XDI | | | | | | 103.3 | | |
| | | H$_{12}$MDI | | | | | | | 86.2 | |
| | Polyol | PCD-1 | 345.3 | | | | | | | |
| | | PCD-2 | | 422.3 | | | 341.1 | 304.0 | 410.7 | 140.0 |
| | | PCD-3 | | | 437.0 | | | | | 280.0 |
| | | PCD-4 | | | | 451.5 | | | | |
| | | CHDM | | | | | 43.0 | 65.8 | | |
| | | PTG2000 | | | | | | | | |
| | | PTG3000 | | | | | | | | |
| | | C2090 | | | | | | | | |
| | | PE1 | | | | | | | | |
| Polyester Polyol | | | | | | | | | | |
| Diethylene Glycol | | | | | | | | | | |
| KBM403 (parts/100 parts by weight solid content) | | | 5 | 5 | 5 | 5 | 5 | 5 | 5 | 5 |
| Solid Content (% by weight) | | | 50 | 50 | 50 | 50 | 50 | 50 | 50 | 50 |
| OH Equivalent (g/mol (solid content)) | | | 2412 | 3093 | 4551 | 5524 | 2044 | 1090 | 3177 | 3501 |

TABLE 1-continued

| | | | | | | | | |
|---|---|---|---|---|---|---|---|---|
| Cyclohexane Ring Concentration (mmol/g(solid content)) | 1.174 | 0.647 | 0.330 | 0.211 | 1.548 | 1.988 | 0.630 | 0.428 |
| Benzene Ring Concentration (mmol/g(solid content)) | 0 | 0 | 0 | 0 | 0 | 0 | 0 | 0 |
| Viscosity (mPa · S/25° C.) | 280 | 420 | 1790 | 1320 | 1160 | 200 | 1070 | 640 |

| | | Polyol Component | I | J | K | L | M | N | O | P | Q |
|---|---|---|---|---|---|---|---|---|---|---|---|
| Polyurethane Polyol | Polyisocyanate | IPDI | | | 34.0 | 45.3 | | 32.5 | | | |
| | | $H_6XDI$ | 138.4 | 23.4 | | | 40.0 | | | | |
| | | $H_{12}MDI$ | | | | | | | | | |
| | Polyol | PCD-1 | 133.0 | | | | | | | | |
| | | PCD-2 | 114.0 | | | | | | | | |
| | | PCD-3 | | | 218.5 | | | | | | |
| | | PCD-4 | | | | | | | | 468.0 | |
| | | CHDM | 82.2 | | | | | | | | |
| | | PTG2000 | | | | 218.5 | | | | | |
| | | PTG3000 | | 451.5 | | | | | | | |
| | | C2090 | | | | | 452.9 | 457.6 | | | |
| | | PE1 | | | | | | 446.6 | | | |
| Polyester Polyol | | | | | | | | | | PE2 | PE3 |
| Diethylene Glycol | | | | | | | | 2.15 | | | |
| KBM403 (parts/100 parts by weight solid content) | | | 5 | 5 | 5 | 5 | 5 | 5 | 5 | 5 | |
| Solid Content (% by weight) | | | 50 | 50 | 50 | 50 | 50 | 50 | 50 | 50 | 60 |
| OH Equivalent (g/mol (solid content)) | | | 1034 | 5524 | 3773 | 11553 | 11421 | 6200 | 2950 | 1575 | 4600 |
| Cyclohexane Ring Concentration (mmol/g(solid content)) | | | 2.61 | 0.211 | 0.309 | 0.389 | 0.394 | 0.289 | 0 | 0 | 0 |
| Benzene Ring Concentration (mmol/g(solid content)) | | | 0 | 0 | 0 | 0 | 0 | 1.76 | 0 | 0 | 3.04 |
| Viscosity (mPa · S/25° C.) | | | — | 1980 | 670 | 2430 | 2260 | 1500 | 76 | 92 | 500 |

Abbreviations in Table 1 are described in the following.

PCD-1: manufactured by Ube Industries, Ltd., 1,6-hexanediol-base polycarbonate diol, number average molecular weight of 500, solid at normal temperature PCD-2: manufactured by Ube Industries, Ltd., 1,6-hexanediol-base polycarbonate diol, number average molecular weight of 1000, solid at normal temperature PCD-3: manufactured by Ube Industries, Ltd., 1,6-hexanediol-base polycarbonate diol, number average molecular weight of 2000, solid at normal temperature PCD-4: manufactured by Ube Industries, Ltd., 1,6-hexanediol-base polycarbonate diol, number average molecular weight of 3000, solid at normal temperature CHDM: cyclohexanedimethanol PTG2000: manufactured by Hodogaya Chemical Co., LTD., polytetramethyleneglycol, number average molecular weight of 2000, solid at normal temperature PTG3000: manufactured by Hodogaya Chemical Co., LTD., polytetramethyleneglycol, number average molecular weight of 3000, solid at normal temperature C-2090: manufactured by Kuraray Co., Ltd. polycarbonate diol, number average molecular weight of 2000, liquid at normal temperature Examples and Comparative Examples Laminating adhesives were prepared by blending a polyol component and a polyisocyanate component according to the formulation and ratio shown in Table 2.

Table 2 also shows the cyclohexane ring concentration (mmol/g) relative to the total (solid content) of the polyol component and the polyisocyanate component.

Evaluation

1) Peel Test at 80° C.

The laminating adhesives of Examples and Comparative Examples were applied in an amount of about 5 g/m² on a treatment surface of a PET sheet (P-60 manufactured by Toray Advanced Film Co., Ltd., 16 microns), and after the solvent was evaporated, the PET sheet was bonded to a treatment surface of a CPP sheet (Torayfan No. ZK-99 manufactured by Toray Advanced Film Co., Ltd., 60 microns), and then aged for four days at 60° C., to give a composite sheet. The composite sheet was subjected to a peel test (201B type (with a constant temperature bath) precision universal testing machine of INTESCO Co., Ltd., a testing sample width 15 mm, a testing speed 50 mm/min) at 80° C., to determine the peel strength. The results are shown in Table 2.

In Table 2, under the "mode" in parenthesis, "cohesion" indicates cohesion and peeling of the adhesive itself, suggesting that cohesive strength of the adhesive is weaker than the adhesion strength at the interface between the adhesive and the sheet. The "cohesion" indicates insufficient adhesion strength even if the peel strength is high.

2) Transparency and Degree of Yellowing

The laminating adhesives of Examples and Comparative Examples were applied in an amount of about 5 g/m² on the surface of a glass plate (JIS R 3202 manufactured by Nippon Testpanel Co., Ltd.), and the plate was bonded to an untreated surface of a CPP sheet (NO ZK-99 manufactured by Toray Advanced Film Co., Ltd., 60 microns), and then aged for four days at 60° C.

Thereafter, the CPP film was peeled off, and irradiated with light using a QUV device for 50 hours continuously. After the plate was taken from the device, transparency was observed, and evaluated as transparency after 50 hours. At the same time, a b-value was measured using a colorimeter. Further, light irradiation was performed using the QUV device for 100 hours continuously. After the plate was taken from the device, transparency was observed, and evaluated as transparency after 100 hours. At the same time, a b-value was measured using a colorimeter. Using the difference of these b-values, i.e., Δb-value, the degree of yellowing of the cured laminating adhesive was evaluated. The results are shown in Table 2.

QUV device: Dewpanel Light Control Weather Meter FDP (manufactured by Suga Test Instruments Co., Ltd.), continuous irradiation, 70° C., 10% RH, irradiance setting 28 W/m²

Colorimeter: spectroscopic colorimeter SE-2000 (manufactured by Nippon Denshoku Industries Co., Ltd.), measurement method: transmittance method.

TABLE 2

| Examples and Comparative Examples | Polyol Component | Polyisocyanate Component | Mixing Ratio (Weight Ratio) OH Component | NCO Component | Cyclohexane Ring Concentration (mmol/g) | Peel Strength at 80° C. (N) (Mode) | Transparency After 50 Hours | After 100 Hours | Degree of Yellowing ΔB-Value |
|---|---|---|---|---|---|---|---|---|---|
| Example 1 | A | A | 16 | 1 | 1.073 | 2.6 (Interface) | a | a | 0.05 |
| Example 2 | B | A | 16 | 1 | 0.591 | 2.1 (Interface) | a | a | −0.06 |
| Example 3 | B | B | 9 | 2 | 1.032 | 2.2 (Interface) | a | a | 0.08 |
| Example 4 | C | A | 20 | 1 | 0.307 | 2.3 (Interface) | a | a | 0.04 |
| Example 5 | D | A | 20 | 1 | 0.196 | 2.3 (Interface) | a | a | 0.05 |
| Example 6 | E | A | 13 | 1 | 1.388 | 2.5 (Interface) | a | a | 0.04 |
| Example 7 | F | A | 13 | 2 | 1.615 | 1.6 (Interface) | a | a | 0.08 |
| Example 8 | F | B | 9 | 5 | 2.534 | Sheet Fracture | b | b | 0.03 |
| Example 9 | F | C | 4 | 1 | 2.587 | 3.1 (Surface Layer) | a | a | −0.02 |
| Example 10 | G | A | 16 | 1 | 0.576 | 1.7 (Interface) | a | a | 0.06 |
| Example 11 | H | A | 16 | 1 | 0.391 | 2.1 (Interface) | a | a | 0.09 |
| Example 12 | I | A | 6 | 1 | 2.088 | 2.1 (Interface) | a | a | 0.17 |
| Example 13 | J | A | 20 | 1 | 0.196 | 1.0 (Interface) | a | a | 0.06 |
| Example 14 | K | A | 17 | 1 | 0.284 | 4.8 (Surface Layer) | a | a | −0.07 |
| Example 15 | L | A | 16 | 1 | 0.356 | 1.2 (Interface) | a | a | 0.04 |
| Example 16 | M | A | 16 | 1 | 0.360 | 1.2 (Interface) | a | a | 0.06 |
| Example 17 | A | C | 16 | 1 | 1.432 | 2.8 (Interface) | a | a | 0.04 |
| Comp. Ex. 1 | N | A | 20 | 1 | 0 | 4.7 (Interface) | c | c | — *1 |
| Comp. Ex. 2 | O | A | 15 | 1 | 0 | 3.4 (Cohesion) | a | a | 0.02 |
| Comp. Ex. 3 | P | A | 9 | 1 | 0 | 1.2 (Interface) | c | c | — *1 |
| Comp. Ex. 4 | Q | A | 20 | 1 | 0 | 4.6 (Cohesion) | a | a | 2.08 |

Transparency Evaluation
*1 Adhesive coating was not transparent and not able to be evaluated
a: Transparent
b: Frost
c: Opaque 3) Heat-And-Humidity Resistance Test The laminating adhesives of Examples 1, 2, and 17, and Comparative Example 4 were applied in an amount of about 5 g/m² on a treatment surface of a CPP sheet (NO ZK-99, manufactured by Toray Advanced Film Co., Ltd., 60 microns), and after the solvent was evaporated, the sheet was bonded to a treatment surface of another CPP sheet, and then aged for four days at 60° C., to give a composite sheet. The composite sheet was set in a Highly Accelerated Stress Test System (model number: TPC-411, manufactured by TABAI ESPEC Corp.), and tested for 168 hours under conditions of 120° C., 85% RH, and 1.6 atmospheric pressures. Thereafter, a peel test (201B type precision universal testing machine of INTESCO Co., Ltd., testing sample width 15 mm, testing speed 300 mm/min) was performed at room temperature to obtain a peel strength, and then a retention rate (heat-and-humidity resistance test/peel strength retention rate (%)) of peel strength after the test of 168 hours was obtained, setting the peel strength before the test as 100%. The results are shown in Table 3.

TABLE 3

| Examples And Comp. Examples | Polyol Component | Polyisocyanate Component | Mixing Ratio (Weight Ratio) | | Cyclohexane Ring Concentration (mmol/g) | Heat-and-Humidity Resistance Test/Peel Strength Retention Rate (%) 168 hr |
|---|---|---|---|---|---|---|
| | | | OH component | NCO component | | |
| Example 1 | A | A | 16 | 1 | 1.073 | 84 |
| Example 2 | B | A | 16 | 1 | 0.591 | 102 |
| Example 17 | A | C | 16 | 1 | 1.432 | 74 |
| Comp. Example 4 | Q | A | 20 | 1 | 0 | 43 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

Industrial Applicability

The laminating adhesive of the present invention is suitably used for laminating outdoor composite sheets.

The invention claimed is:

1. A method of laminating an outdoor composite sheet comprising:
    (1) providing a two-component polyurethane laminating adhesive comprising a polyisocyanate component (A) and a polyol component (B), wherein
    the polyisocyanate component (A) contains a polyisocyanate (A1) that does not contain an aromatic ring,
    the polyol component (B) contains a macropolyol (B1) that does not contain an aromatic ring but contains a cyclohexane ring,
    the macropolyol (B1) is a polyurethane polyol (B1-1') obtained by reaction of a crystalline polyol (B1-1a') that does not contain an aromatic ring and is crystalline at normal temperature with a polyisocyanate (B1-1b) that does not contain an aromatic ring but contains a cyclohexane ring,
    the polyisocyanate (A1) is selected from the group consisting of 3-isocyanatomethyl-3,5,5-trimethylcyclohexyl isocyanate, 4,4'-, 2,4'- or 2,2'-dicyclohexylmethane diisocyanate or mixtures thereof, and 1,3- or 1,4-bis(isocyanatomethyl) cyclohexane or mixtures thereof,
    the polyisocyanate (B1-1b) is selected from the group consisting of 3-isocyanatomethyl-3,5,5-tri[Mi]methylcyclohexyl isocyanate, 4,4'-,2,4'- or 2,2'-dicyclohexylmethane diisocyanate or mixtures thereof, and 1,3- or 1,4-bis(isocyanatomethyl) cyclohexane or mixtures thereof,
    the crystalline polyol (B1-1a') contains a crystalline polycarbonate diol that is crystalline at normal temperature, wherein the crystalline polycarbonate diol(B1-1a') has a number average molecular weight of 1000 or less, and
    a silane coupling agent is mixed in one of or both of the polyisocyanate component (A) and the polyol component (B); and
    (2) applying the laminating adhesive to an outdoor composite sheet by mixing the polyisocyanate component (A) and the polyol component (B) when laminating, applying the mixture on a surface of one sheet material using a laminator and then bonding the obtained sheet to the other sheet material.

* * * * *